United States Patent [19]

Shemeta et al.

[11] Patent Number: 4,700,471
[45] Date of Patent: Oct. 20, 1987

[54] DEVICE FOR ORIENTING AND CONVEYING A HEADED FASTENER

[75] Inventors: Paul J. Shemeta, Seattle; Daniel A. Hendricks, Bothell, both of Wash.

[73] Assignee: The Boeing Company, Seattle, Wash.

[21] Appl. No.: 797,962

[22] Filed: Nov. 14, 1985

[51] Int. Cl.⁴ .................... B23Q 7/10; B23Q 7/12; B65H 9/00
[52] U.S. Cl. .................................. 29/809; 221/173; 221/171
[58] Field of Search .................... 29/809, 813, 822; 221/171, 173, 156, 157, 165, 167

[56] References Cited

U.S. PATENT DOCUMENTS

| | | | |
|---|---|---|---|
| 1,971,221 | 8/1934 | Hunker et al. | 91/12.6 |
| 2,085,615 | 6/1937 | Taylor | 221/171 |
| 2,418,355 | 4/1947 | Kirsch et al. | 209/72 |
| 2,471,793 | 5/1949 | Stull | 221/171 |
| 2,588,486 | 3/1952 | Clarke | 218/6 |
| 2,609,912 | 9/1952 | Engel | 198/33 |
| 2,713,930 | 7/1955 | Koch | 221/171 |
| 2,823,830 | 2/1958 | Kreidler | 221/171 |
| 3,207,362 | 9/1965 | Gilbride et al. | 221/171 |
| 3,535,764 | 10/1970 | Hoffmann | 29/809 |
| 3,578,142 | 5/1971 | Burgess | 221/171 |
| 3,815,805 | 6/1974 | Beneteau | 227/119 |
| 4,019,666 | 4/1977 | Foults | 227/119 |
| 4,205,763 | 6/1980 | Merl | 221/173 |
| 4,354,588 | 10/1982 | Wolfertz | 198/394 |
| 4,427,146 | 1/1984 | Seki | 227/119 |
| 4,592,136 | 6/1986 | Hirsch | 29/809 |

Primary Examiner—Howard N. Goldberg
Assistant Examiner—Steven Nichols
Attorney, Agent, or Firm—Christensen, O'Connor, Johnson & Kindness

[57] ABSTRACT

Disclosed is device (10) for orienting and conveying a headed fastener (14), wherein the device is positioned beneath any suitable dispenser (12) whereby headed fasteners are removed from a supply container and successively dropped with random orientation onto the device. The device (10) is configured to receive the headed fasteners (14) within a selected groove (32, 132) so that the headed fastener will assume a predetermined orientation within the device. The oriented fastener is then conveyed from the point it is received in the groove to a conduit (55, 57) which directs the headed fastener into the feeder tube (16) of the fastening machine. The fasteners are rotated as they are conveyed along the device in order to create a gyroscopic effect in the fastener as a means of maintaining the relative orientation of the fastener as it moves through the groove toward the feeder tube.

11 Claims, 4 Drawing Figures

DEVICE FOR ORIENTING AND CONVEYING A HEADED FASTENER

TECHNICAL AREA

This invention relates to orienting and conveying devices and, more particularly, devices for orienting and conveying headed fasteners.

BACKGROUND OF THE INVENTION

Automatic fastening machines, i.e., machines that automatically insert fasteners into a part for assembly purposes, are used in a variety of industrial environments. In the aircraft industry fastening machines that automatically drill a hole and install a fastener (e.g., a rivet) are used in fabricating wings and other parts of an aircraft. Typically, such fastening machines are fed by fastener feed systems that include a feeder tube through which fasteners are moved by gravitational or other forces (e.g., air pressure) to the machine. Either headed or non-headed fasteners are installed by the fastening machines depending upon the particular structural requirements of the fabricated part. The present invention was developed for use primarily with headed fasteners.

Most modern fastening machines designed to install headed fasteners require the headed fasteners to be delivered in a particular orientation, usually shank first. Since the cross-sectional area of the feeder tubes of such machines are sized so that the headed fastener cannot be inverted once a fastener enters the tube, orientation checking mechanisms are located at some point along the feeder tube. The checking mechanisms detect the orientation of a headed fastener passing the feeder tube and reject (i.e., remove from the feeder tube) any headed fasteners that are improperly oriented.

The cost of handling rejected fasteners would be greatly reduced if the fasteners could be consistently fed to the feeder tube in the correct orientation. To this end, the present invention is directed to a device for conveying headed fasteners from a supply source (in which the fasteners are stored in random orientation) to the feeder tube of a fastening machine in a manner that results in each headed fastener entering the feeder tube in the proper orientation.

SUMMARY OF THE INVENTION

In accordance with this invention, a device for orienting and conveying a headed fastener is provided. Randomly oriented fasteners are dropped one at a time into the device, which orients the fasteners in a particular manner. The oriented fastener is conveyed to a conduit that directs the headed fastener into the feeder tube of a fastening machine. The fastener is rotated as it is conveyed in gyroscopic manner that maintains the particular desired fastener orientation. The particular orientation of the fasteners in the device is such that the fasteners enter the feeder tube with their shanks first.

A preferred embodiment of a headed fastener orienting and conveying device formed in accordance with this invention specifically comprises a support frame and at least one guide member attached to the support frame. The guide member has a guide groove formed therein. The guide groove has an upper section and a lower section and an output end. The guide groove is shaped so that the width of the upper section of the guide groove is greater than the width of the lower section of the guide groove. The guide groove is sized so that when a headed fastener is dropped into the guide groove, the head of the fastener remains in the upper section. Only the shank portion of the headed fastener passes into the lower section of the guide groove. A ram, shaped to fit within the guide groove and operable for longitudinal movement through the guide groove, pushes the headed fastener along the length of the guide groove. The ram has a gyration mechanism attached at the end that contacts the headed fastener. The gyration mechanism creates the fastener rotational motion that maintains the headed fastener's orientation as the fastener is pushed through the guide groove. The ram pushes the headed fastener out the output end of the groove where it is received by a conduit that directs the fastener into the feeder tube of the fastening machine. The ram is retracted before the next fastener is dropped into the groove in order to convey that fastener as just described.

In accordance with other aspects of this invention, the gyration mechanism includes a roller mounted on the ram for rotation about an axis substantially parallel to the longitudinal axis of the headed fastener positioned in the guide groove. The roller is mounted to frictionally engage a surface of the guide groove. The frictional engagement causes the roller to rotate as the ram moves through the guide groove.

As another aspect of this invention, the device formed in accordance therewith includes a second guide member having an associated guide groove of a different size than the groove so that a wider range of fastener sizes can be accommodated by the device. A ram fits within and moves through each groove.

As yet another aspect of this invention, a bridge piece is mounted between the two guide members. The bridge piece carries an upwardly facing recess suitable for receiving dropped non-headed fasteners therein. A push rod operated for reciprocal movement through the recess pushes the non-headed fasteners through the recess to the feeder tube of the fastening machine.

As yet another aspect of this invention, the device formed in accordance with this invention includes a momentum reduction mechanism located beneath the point where the fasteners are dropped and above the guide members and bridge piece. The falling fasteners collide with the momentum reduction mechanism wherein a substantial amount of the falling fastener's momentum is transferred to the momentum reduction mechanism. The fasteners are less likely to bounce out of the guide grooves when their momentum is so reduced.

BRIEF DESCRIPTION OF THE DRAWINGS

The invention with its attendant advantages will become better understood from the following detailed description when considered in combination with the accompanying drawings, wherein.

DETAILED DESCRIPTION OF THE PREFERRED EMBODIMENT

Figure 1:
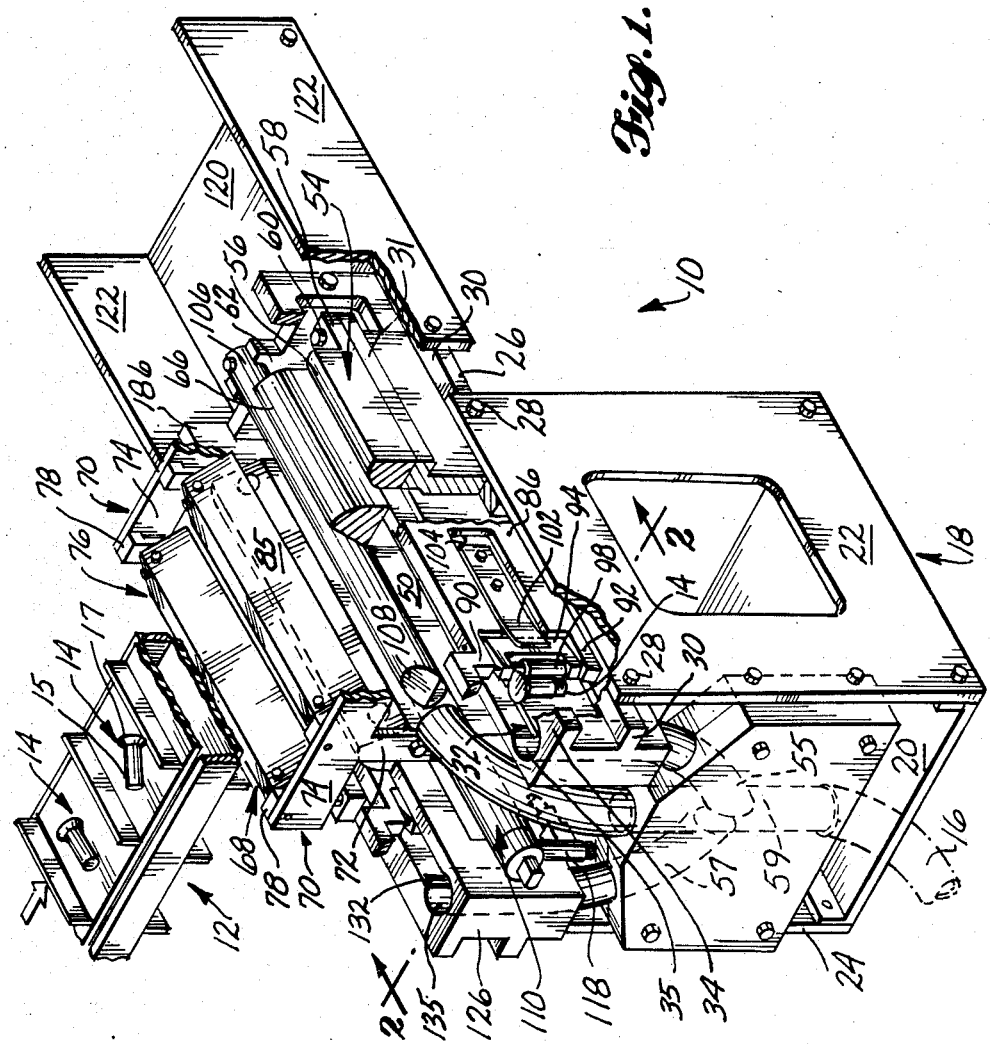
FIG. 1 is an isometric view of a headed fastener orienting and conveying device formed in accordance with this invention.

Generally, with reference to FIG. 1, a headed fastener orienting and conveying device 10 formed in accordance with this invention has a pair of grooved guide members 26, 126. Headed fasteners 14 are successively dropped into one of the grooves 32 or 132 in the guide members from a fastener dispenser 12. The dispenser 12 is aligned with the particular groove 32 or 132 that is sized to receive the fastener being dropped. The received fasteners are oriented shank down within the groove. Each oriented fastener is then conveyed through the groove and into an associated conduit 55 or 57 that is connected to the end of the groove. The fastener moves from the conduit to the feeder tube 16 of a fastening machine. The headed fastener 14 is moved through the groove to the conduit by a ram 86 or 186 that both moves the headed fastener 14 through the groove and imparts rapid rotational motion to the fastener about its longitudinal axis. The rotation creates a gyroscopic effect that tends to maintain the headed fastener in the shank-down orientation as it is moved through the groove to the feeder tube.

A momentum reduction mechanism 68 is located between the dispenser 12 and the guide members 26, 126. A falling fastener 14 collides with the momentum reduction mechanism, which yields to the fastener and reduces its momentum before it reaches the guide groove. With their momentum so reduced, the falling fasteners will not bounce out of the grooves.

A bridge piece 48 carrying an elongate recess 52 is affixed between the pair of guide members 26, 126. The recess in the bridge piece 48 receives non-headed fasteners that are dropped by the dispenser 12. A push rod 106 slides within the recess 52 and pushes the non-headed fastener into a conduit 59 that leads to the feeder tube 16 of the fastening machine.

FIGS. 1–4 show a preferred embodiment of a headed fastener orienting and conveying device 10 formed in accordance with this invention. The headed fastener orienting and conveying device 10 is positioned beneath a fastener dispenser 12. The dispenser 12 delivers a succession of headed fasteners 14 from a supply container (not shown) to a point above the device 10 where the fasteners are dropped. The dropped fasteners are received by the device 10, which orients the fasteners and conveys the oriented fasteners to the feeder tube of a fastening machine.

The headed fastener dispenser 12 can be any apparatus suitable for dropping a succession of headed fasteners onto the device 10. As will become clear upon reading this description, the relative position of the dispenser 12 with respect to the device 10 is variable so that the headed fasteners can be dropped onto more than one location on the device. In the embodiment shown, the dispenser 12 comprises a compartmentalized conveyor extending between a supply container and a point above the device, with each compartment carrying a randomly-oriented headed fastener 14. The headed fasteners 14 are loaded onto the conveyor by any suitable mechanism. Such mechanisms form no part of this invention. After each headed fastener has been dropped onto and received by the device, it is pushed through the device into a feeder tube 16 of a fastening machine (not shown) by a hereinafter described ram.

The device 10 comprises a frame 18 that includes a baseplate 20 and first and second side plates 22 and 24. The lower ends of the side plates are fastened to opposing edges of the baseplate. The side plates 22 and 24 extend orthogonally upwardly from the baseplate 20. The upper end of the first side plate 22 supports a first guide member 26 formed of an elongate piece of material, such as aluminum, that is substantially rectangular in cross section. The first guide member 26 is attached to the first side plate 22 by threaded fasteners 28 that pass through the side plate and extend into a rectangular lower rib 30 that is formed in the first guide member 26. The lower rib 30 projects outwardly from one side of the guide member along the entire length thereof. A rectangular top rib 31 is integrally formed in the top portion of the first guide member and extends outwardly therefrom.

The first guide member 26 includes an elongate guide groove 32 that extends along the length of that guide member parallel to the guide member's longitudinal axis and through the top surface 34 of the guide member. The forward end (i.e., with respect ot FIG. 1) of the guide groove 32 terminates at a cylindrical opening 35 that extends through the first guide member 26 from top to bottom. The longitudinal axis of the cylindrical opening 35 lies substantially orthogonal to the longitudinal axis of the first guide member 26.

The guide groove 32 has an upper section 36 and a lower section 38, the former being slightly wider in cross section than the latter. The side surfaces 40 of the guide groove 32 that define the opposing sides of the upper section 36 are substantially parallel to each other and vertically oriented. Likewise, the side surfaces 42 that define the opposing sides of the lower section 38 of the guide groove are substantially parallel to each other and vertically oriented. The guide groove 32 has sloping surfaces extending between the upper section side surfaces 40 and lower section side surfaces 42 that define ledges 44 disposed on each side of the groove. The groove also has a flat bottom surface 43 that extends orthogonally between the lower section side surfaces 42.

The guide groove 32 of the first guide member is configured to receive and guide a headed fastener that is dropped into the groove. In this regard, the lower section 38 of the guide groove slightly wider than the diameter of the shank 15 of a headed fastener 14, but slightly narrower than the head 17 of the fastener. The upper section 36 of the guide groove is slightly wider than the head 17 of the headed fastener 14. Hence, when a headed fastener is dropped into the guide groove, the headed fastener will come to rest with its head 17 bridged between the ledges 44 on each side of the groove and its shank 15 hanging in the lower section.

Because a single guide groove can only accommodate a certain range of conventional headed fastener sizes, the preferred embodiment of the invention illustrated in FIGS. 1–4 includes a second guide member 126 having a guide groove 132 narrower than the guide groove 32 of the first guide member. It is to be understood that while the inclusion of a second guide member (or third or fourth, etc.) in embodiments of the invention adds versatility, a single guide member embodiment falls within the scope of this invention.

The second guide member 126 is configured and arranged in a manner substantially similar to the just-described first guide member. Specifically, the upper end of the second side plate 24 supports the second guide member 126 via threaded fasteners 128 that pass through the second side plate 24 and enter a rectangular center rib 130 that projects outwardly from one side of the second guide member 126 along the entire length thereof. A top rectangular rib 131 is formed in the upper portion of the second guide member 126 and extends outwardly therefrom.

As noted, the second guide member 126 has an elongate guide groove 132, which is configured substantially the same as the guide groove 32 of the first guide member 26. Accordingly, the guide groove 132 of the second guide member 126 includes an upper section 136, a lower section 138 and projecting ledges 144 on each side of the groove.

The forward end of the guide groove 132 of the second guide member 126 terminates a cylindrical opening 135 that extends completely through the forward end of the second guide member 126 from the top to the bottom. The longitudinal axis of the cylindrical opening 135 is substantially orthogonal to the longitudinal axis of the second guide member. The rearward end of the guide groove 132 of the second guide member terminates at the rearward end of the second guide member.

A bridge piece 48 (FIG. 2) is mounted between the first and second guide members 26 and 126. The bridge piece is substantially rectangular in cross section and is positioned between the two guide members so that its top surface 50 is substantially coplanar with the top surfaces 34 and 134 of the first and second guide members, respectively. The bridge piece 48 is shorter than the guide grooves, extending along approximately the rearward two-thirds length of the guide members. An elongate recess 52 of semicircular cross section is formed in the center of the top surface 50 of the bridge piece 48. The recess 52 is configured to receive fasteners 14' dropped therein that have substantially constant cross-sectional shape (typically cylindrically-shaped with no heads). Such fasteners can be delivered from the recess 52 to the feeder tube 16 of the fastening machine with either end first, as hereinafter discussed. Incorporation of the bridge piece 48 with recess 52 adds versatility to the device by providing the device with the capability of conveying non-headed as well as headed fasteners to the fastening machine. When non-headed fasteners are to be used, the relative position of the device 10 with respect to the fastener dispenser apparatus 12 is changed so that the fasteners 14' will drop into recess 52.

A junction box 53 is fastened to the forward end of frame 18 beneath the forward or output ends of the first and second guide members 26 and 126, respectively. The otherwise solid box 53 has cylindrical passages formed therein to accommodate correspondingly-shaped first, second, and third conduits 55, 57, and 59, respectively. The third conduit 59 extends vertically through the center of the junction box 53, exits the top of the junction box and curves inwardly to terminate at the forwardmost end of the recess 52 formed in the bridge piece 48. The other end of the third conduit 59 is connected to the feeder tube 16 of the fastening machine. The third conduit 59 is configured so that when a fastener is pushed out of recess 52 it slides through the third conduit into the feeder tube 16.

The first conduit 55 extends between the bottom of the cylindrical opening 35 located at the forward end of the guide groove 32 formed in the first guide member 26, and a point in the box where the first conduit joins the third conduit 59. Headed fasteners pushed out of the guide groove 32 into the cylindrical opening 35 first travel through the first conduit 55 to the third conduit 59. The third conduit directs the fasteners into the feeder tube 16 of the fastener machine.

The second conduit 57 extends between the bottom of the cylindrical opening 135 located at the forward end of the guide groove 132 formed in the second guide member 126 and a point in the box where the second conduit joins the third conduit. Headed fasteners pushed out of the guide groove 132 into the cylindrical opening 135 first travel through the second conduit 57 to the third conduit 59. The third conduit directs the fasteners into the feeder tube 16 of the fastening machine. The diameters of the cylindrical openings 35 and 135 located at the forward ends of both guide grooves and the diameters of the first, second, and third conduits are such that once a fastener is inserted therein, it cannot be inverted.

Located along the portions of the guide members 26 and 126 that lie beneath the fastener dispenser 12 are deflection elements. The deflection elements are fixed to the top surfaces of the guide members on either side of the guide grooves. The deflection elements are shaped to provide an enlarged opening above the guide grooves to facilitate entry of the dropped headed fasteners into the grooves. Specifically, the first guide member 26 has an outer deflection element 54 fastened to its top surface 34 along the rearward two thirds of its length. The outer deflection element 54 is an elongate member which, in cross section, has two flat sides and a concave-curved side 56. A substantially flat rectangular boss 58 protrudes from each end of the outer deflection element 54. Threaded fasteners 60 are screwed through the bosses 58 and into the first guide member 26 to secure the deflection element 54 to the portion of the top surface 34 of the guide member that extends outwardly from the guide groove 32. The outer deflection element 54 is positioned so that one edge of its concave-curved side 56 meets the upper edge of to the adjacent upper section side surface 40 of the guide groove 32, thereby providing an upward extension of that surface that curves outwardly from the guide groove.

An inner deflection element 62 is fastened by countersunk threaded fasteners 64 along the portion of the top surface 34 of the first guide member 26 that is on the inward side of the guide groove. In cross section the inner deflection element 62 has two flat sides and one concave-curved side 66. The inner deflection element is positioned so that one edge of its concave-curved side 66 meets the upper edge of the adjacent upper section side surface 40 of the guide groove 32 thereby providing an upper extension of that surface that curves outwardly from the guide groove. The effect of the just-described outer and inner deflection elements 54 and 62, respectively, is to create a gradually converging vertical entrance passage into the guide groove 32 so that dropped headed fasteners 14 will be directed to enter the groove regardless of how the fasteners were originally oriented.

An outer deflection element 154 and inner deflection element 162 are attached on either side of the guide groove 132 of the second guide member 126. These deflection elements are configured and mounted on the second guide member 126, about guide groove 132, in a manner substantially identical to the corresponding outer deflection element 54 and inner deflection element 62 of the first guide member 26.

The facing flat sides of the two inner deflection elements 62 and 162 define a tapered entrance passage above the recess 52 that is formed in the top of the bridge piece 48. With this configuration, non-headed fasteners 14' dropped in any orientation from above this passage are directed into the recess.

It has been found that the dropped headed fasteners 14 are less likely to bounce out of the guide grooves if the momentum they gather during the fall is partially dissipated prior to the fasteners striking any portion of the guide groove. To this end, a momentum reduction mechanism 68 is incorporated into the preferred embodiment of this invention. The momentum reduction mechanism is located between the fastener dispenser 12 and the heretofore-described fastener orienting and conveying mechanism. The momentum reduction mechanism 68 includes two gate supports 70 that are thin, flat, roughly T-shaped members. More specifically, each gate support 70 includes a pair of spaced-apart vertical legs 72 and an integrally formed crossbar 74. The lower ends of the vertical legs 72 of one of the gate supports are fastened to the forward face of the bridge piece 48 on either side of the recess 52. The vertical legs 72 of the other gate support 70 are similarly fastened to the rearward face of the bridge piece.

Extending between the two crossbars 74 of the gate supports 70 are four gates 76. The gates 76 are formed of thin lightweight material such as aluminum sheets that are bent into V-shape in cross section. Each end of each gate has a pivot bracket 78 (FIG. 4) fastened thereto. A pin 80 extends outwardly from each bracket at the apex of the V-shaped portion of the gate. The gates are mounted to be free-swinging between the two crossbars 74 of the gate supports. Accordingly, the pin 80 extending from each end of a gate loosely fits within a corresponding aperture formed in the crossbars 74. The gates lie parallel to one another and are hung such that they form inverted V's when undisturbed. The gates are spaced apart so that the edges of the legs 85 of the adjacent gates either touch or are closely spaced. The adjacent edges are vertically aligned either with one of the guide grooves 32, 132, or with the recess 52.

When a fastener 14 is dropped downwardly toward a groove or the recess, it impinges on one or both of the gate legs 85 that span the underlying groove or recess. The kinetic energy of the falling headed fastener is transferred to the gates, which swing open (as shown in dotted lines in FIG. 2) and allow the now slower-moving fastener to tumble into the groove. The energy transfer provided by the gates substantially reduces, if not entirely eliminates, the possibility of fasteners bouncing out of the grooves and recess.

Figure 2:
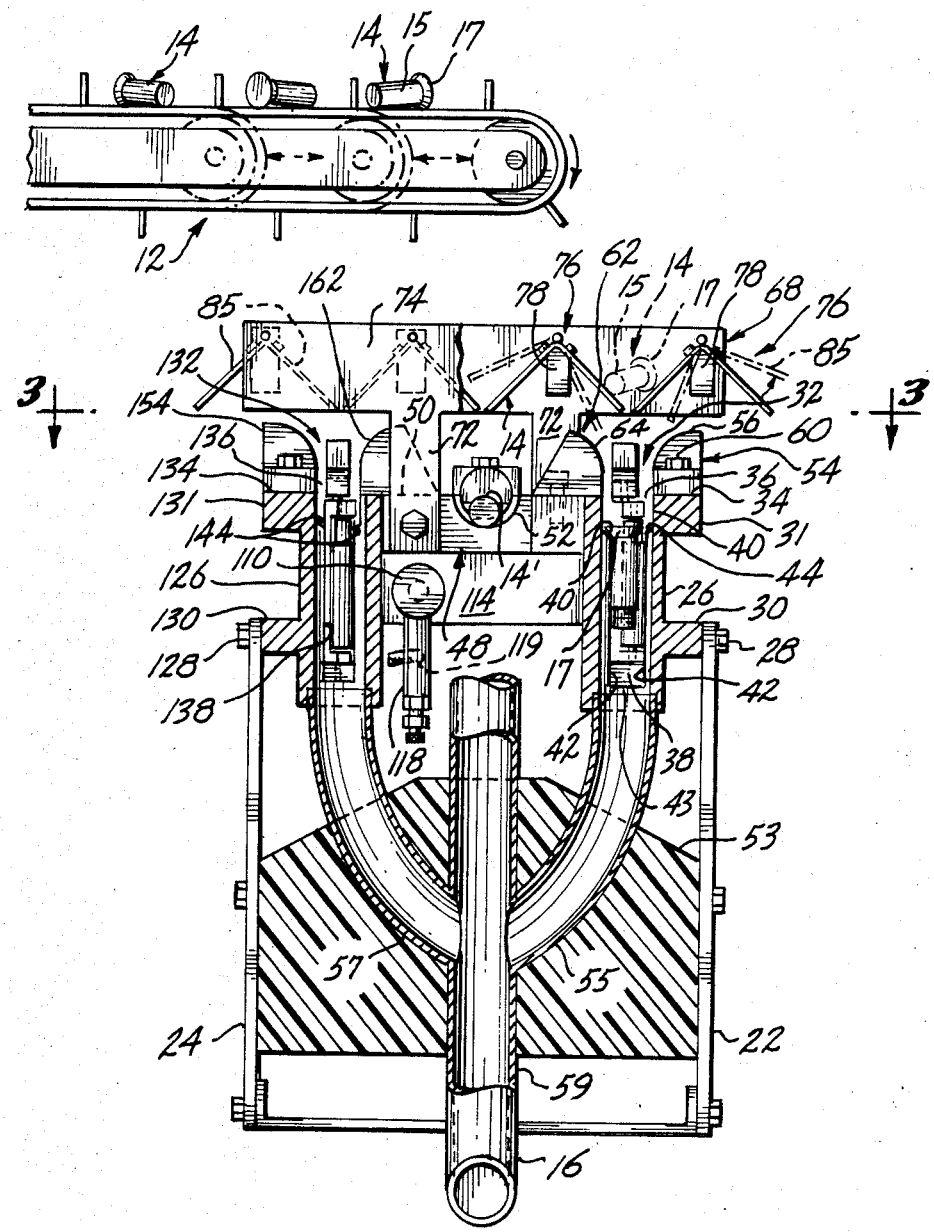
FIG. 2 is a cross-sectional view of the headed fastener orienting and conveying device of FIG. 1 taken along line 2—2.
Figure 3:
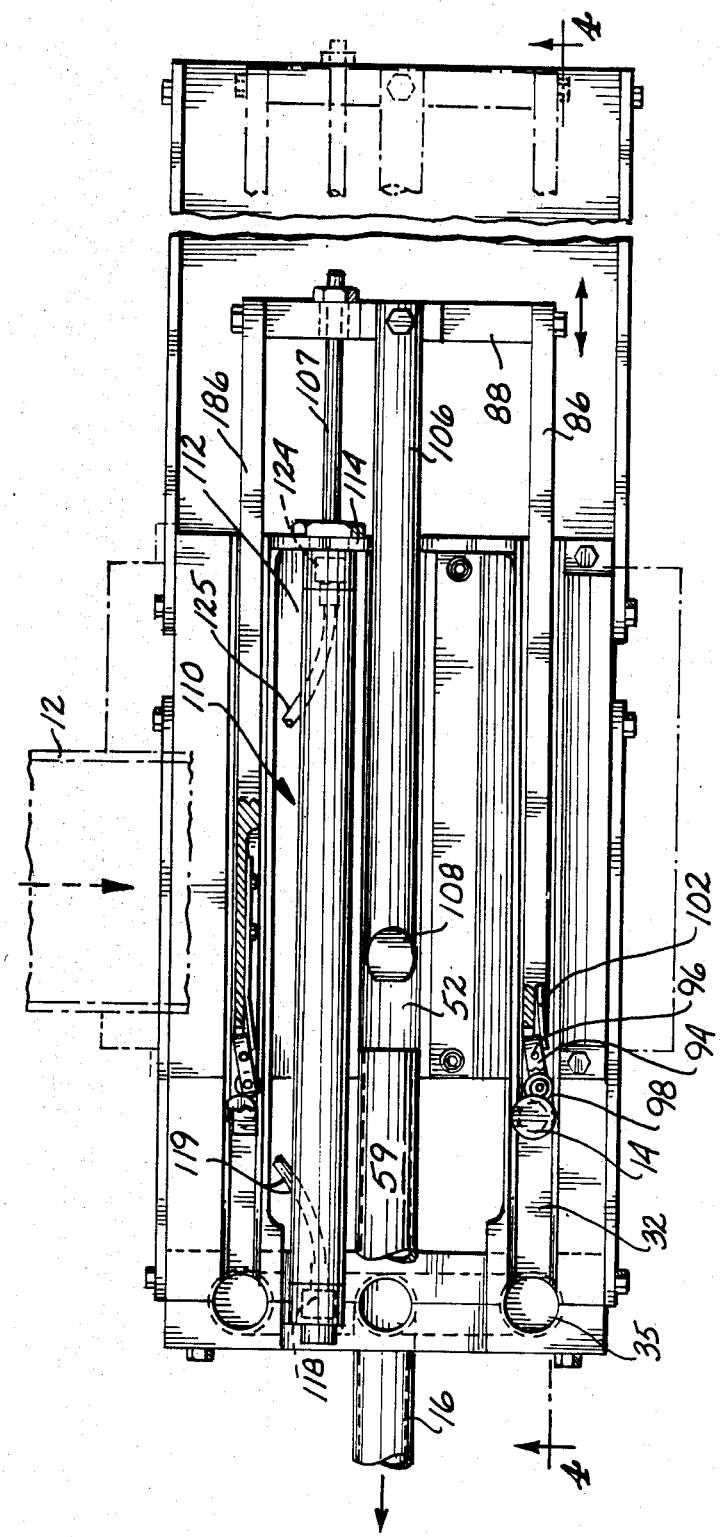
FIG. 3 is a top sectional view of the headed fastener orienting and conveying device of FIG. 1 taken along line 3—3 of FIG. 2.
Figure 4:
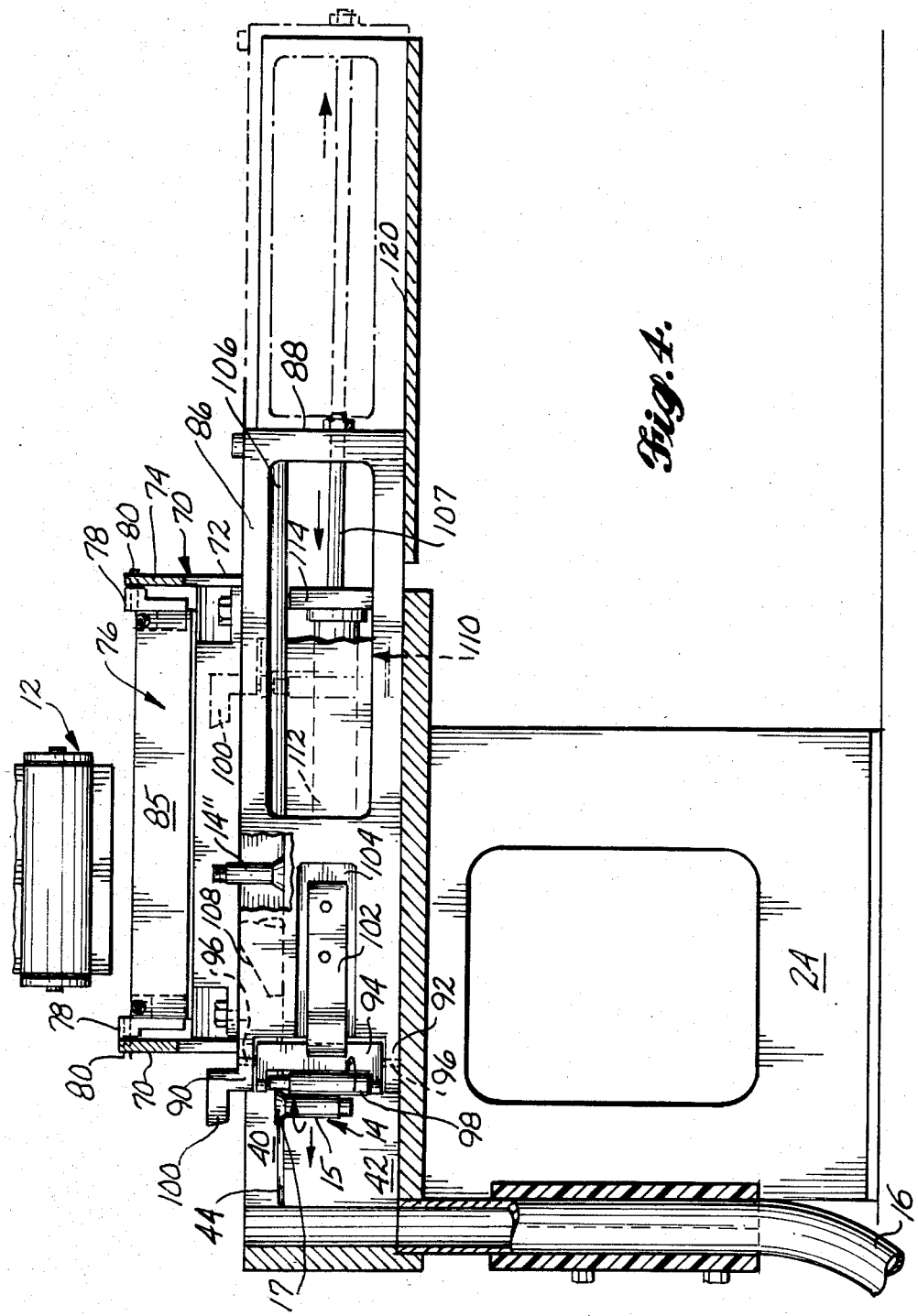
FIG. 4 is a side sectional view of the headed fastener orienting and conveying device of FIG. 1 taken along line 4—4 of FIG. 3.

With reference to FIG. 2, the relative position of the fastener dispenser 12 and the orienting and conveying device 10 is changed by either moving the dispenser apparatus (as shown in the dotted lines of the figure) or, alternatively, by moving the device. Such repositioning is needed to provide vertical alignment between the point where the dispenser 12 dispenses fasteners and the guide grooves or recess designed to receive fasteners. Accordingly, either guide groove 32 or 132 can be utilized when relatively larger or smaller headed fasteners are required by the fastening machine, or the recess 52 can be employed when non-headed fasteners are required.

Once a headed fastener is positioned in one of the guide grooves, it is conveyed longitudinally along the guide groove from the point where it is received to the cylindrical opening located at the forward end of the receiving guide groove. With reference to FIGS. 1 through 4, the mechanism for conveying the headed fasteners along the guide grooves is now discussed.

Referring to the first guide member 26, after a headed fastener 14 is dropped into the groove 32, it is pushed by the forward end of a first ram 86 that is mounted for reciprocal sliding movement along the longitudinal axis of the groove 32. The first ram 86 is an elongate bar-like member having a width slightly less than the width of the lower section 38 of the guide groove 32. The first ram 86 has a flat bottom that slides along the flat bottom surface 43 of the guide groove 32.

The forward end of the first ram 86 not only pushes the headed fastener 14 through the guide groove 32, it also imparts longitudinal rotational movement to the headed fasteners. The rotational movement creates a fastener gyroscopic effect that tends to prevent the fastener from being knocked out of its oriented position (i.e., its vertical shank-down position) while it is being pushed through the groove. In this regard, it has been found that when a rapidly moving ram initially contacts a relatively lightweight headed fastener, the headed fastener lurches away from the ram. The lurch often results in the fastener tipping out of its vertical orientation. Often, subsequent impacts between the ram and the headed fastener occur before the tipped headed fastener returns to its vertical orientation. This situation leads to further swinging and bouncing of the headed fastener, which can result in the headed fastener swinging out of the guide groove, becoming inverted, and entering the cylindrical opening at the end of the guide groove head-first rather than shank-down.

It has been found that if the headed fastener is rapidly rotated when contacted by a ram, the rotation will create a gyroscopic effect in the headed fastener that resists forces tending to alter the vertical orientation of the fastener. Accordingly, the first ram 86 includes a gyration assembly attached to its forward end. Specifically, the first ram has an upper projecting portion 90 and a lower projecting portion 92. The upper and lower projecting portions are spaced apart and project forwardly from the forward end of the first ram. The upper projecting portion 90 projects from the top of the ram and the lower projecting portion 92 projects from the bottom of the ram.

Between the upper and lower projecting portions 90 and 92 respectively, a bracket 94 is pivotally mounted via pivot pins 96 that extend through the upper and lower projecting portions, into the top and bottom of the bracket 94. The bracket 94 carries a roller 98 that is rotatably mounted forward of the pivot pins 96, with its rotational axis substantially parallel to the longitudinal axis of a headed fastener 14 that is vertically oriented in the guide groove 32. As a result, the side of the roller contacts the headed fastener located upstream of the ram when the ram is moved down the guide groove.

On rare occasions, a headed fastener 14" (shown in dotted lines in FIG. 4) will land in the groove 32 with its head extending between the ledges 44 of the guide groove and its shank projecting upwardly. So positioned, a headed fastener is knocked over by an extension piece 100 located at the upper leading edge of the ram. The extension piece 100 is formed by an arm that juts up and out so as to overlie the groove 32, ahead of the roller. The extension piece tips over inverted headed fastener 14" on contact so that it falls into the groove and assumes the proper shank-down orientation prior to being contacted by the roller.

As the ram 86 moves through the groove, the rotational motion of the roller 98 is generated by frictional contact with a side surface 42 of the lower section 38 of the guide groove 32. The roller 98 is brought into contact with one of the side surfaces 42 of the lower groove section by an elongate leaf spring 102. The leaf spring 102 fits within a correspondingly-shaped recess 104 formed in the forward edge of the first ram 86. One end of the leaf spring is attached at one end of the ram, the free end of the leaf spring bears upon the bracket 94 that carries the roller at a point rearward to the pivot pins 96 that attach the bracket to the ram. The force created by the leaf spring causes the bracket to rotate about the pivot pins and press the roller 98 against a side surface 42 of the groove.

When the first ram 86 moves forwardly in the guide groove 32, the rotating roller 98 comes into contact with the headed fastener. The upper end of the roller 98 has an annular recess 99 formed therein. The recess is sized so that the radially protruding portion of the head 17 of the fastener projects into it when the roller 98 is moved against the fastener. Therefore, the shank 15 of the fastener frictionally contacts the lower portion of the roller 98. The frictional contact between the roller and the shank rotates the headed fastener. With the roller 98 pressed against one side of the guide groove, the contact between the roller 98 and the fastener 14 will be slightly off-center (with respect to the longitudinal axis of the guide groove). Such contact will move the shank of the headed fastener 14 against the side of the guide groove opposite the side that the roller contacts. The frictional contact between the shank of the fastener and the side of the groove enhances the rotational motion of the headed fastener 14 that is imparted by contact with the roller 98 by reducing the amount of slippage that would occur between the roller and the fastener in the absence of such contact.

The rearward end of the first ram 86 is fastened to a flat bar-like end piece 88 that extends orthogonally between the rearward end of the first ram 86 and the rearward end of a second ram 186 that is overall narrower than the first ram 86 but otherwise substantially identical to it. The second ram 186 fits within the guide groove 132 of the second guide 126 and is configured and arranged to function substantially identically to the first ram 86.

A cylindrical push rod 106 is slidably mounted in the recess 52 formed in the bridge piece 48. The push rod has a forward tapered end 108 that pushes any fasteners that are dropped into the recess out to the feeder tube 16 of the fastening machine via the third conduit 59 when the push rod slides through the recess. The push rod 106 is fastened at its rearward end to the top central portion of the end piece 88 between and parallel to the first ram 86 and second ram 186.

The two rams and the push rod 106 are reciprocally slid along their respective grooves and recess by a double-acting piston and cylinder assembly 110 that is disposed beneath the bridge piece 48. The rod end of the cylinder 112 of the assembly 110 is fastened to a flat, thin rear wall 114 that is integrally formed with and extends between the first and second guide members at the rearward ends thereof beneath bridge piece 48. The cylinder is fastened so that the piston rod 107 of the assembly 110 can pass through an aperture formed in the rear wall. The end of the piston rod 107 is fastened to the end piece 88. A first pneumatic fitting 118 and tube 119 connects the end of the cylinder remote from the rod to a pressurized air source (not shown). When pressurized air is directed through tube 119 and fitting 118, the piston rod 107 moves outwardly and forces the end piece 88 (with its attached rams and push rod) to slide rearwardly into a retracted position, as shown in dotted lines in FIGS. 3 and 4. It is when the rams and push rod are so positioned that a fastener is dropped into a guide groove or recess. A platform 120 fastened to the rearward ends of the first and second guide members 26 and 126 provides a flat, smooth supporting surface over which the end piece 88 slides. Platform 120 has upwardly projecting sides 122 for guarding against inadvertent contact with the moving end piece as it is retracted.

A second pneumatic fitting 124 is attached to the rod end of the cylinder 110. A tube 125 connects the fitting 124 to the source of pressurized air. When pressurized air is directed into the cylinder via the second pneumatic fitting, piston rod 107 is moved inwardly, causing the connected rams and push rod 106 to also move forwardly through their associated grooves and recess. As described above, such movement conveys any fastener residing in the guide grooves or recess into the conduits located at the forward end of the device for delivery to the feeder tube of the fastening machine.

It can be appreciated that any conventional control devices can be employed to control the delivery of pressurized air to the cylinder to coordinate the forward and rearward movement of the rams and push rod with the successive dropping of fasteners into a guide groove or recess. Such controls are readily employed by one of skill in the art and form no part of this invention.

While the invention has been described with reference to a preferred embodiment, it is clearly understood by those skilled in the art that the invention is not limited thereto, rather the scope of the invention is to be interpreted only in conjunction with the appended claims.

The embodiments of the invention in which an exclusive property or privilege is described are defined as follows:

1. A device for orienting and conveying a headed fastener comprising:
    (a) a support frame;
    (b) an elongate guide member attached to the support frame, the guide member having a guide groove formed therein, the guide groove having an upper section and a lower section and an output end, the guide groove being configured so that when a headed fastener is dropped into the guide groove the head of the fastener will pass into the upper section of the guide groove but not into the lower section and the shank portion of the headed fastener will pass into the lower section of the guide groove, the headed fastener thereby assuming an oriented position within the guide groove;
    (c) a ram, the ram being shaped to fit within the guide groove and operable for longitudinal movement through the guide groove to contact the headed fastener in the guide groove and move the headed fastener along the length of the guide groove, the ram having gyration means attached to the end of the ram that contacts the headed fastener for creating rotational movement of the headed fastener as the headed fastener is moved along the guide groove, the ram being configured to push the headed fastener to the output end of the groove, and, (d) conduit means operatively associated with the output end of the guide groove for receiving the headed fastener after it leaves the output end of the guide groove.

2. The device of claim 1, wherein the gyration means includes a roller mounted on the ram for rotation about an axis lying substantially parallel to the longitudinal axis of the headed fastener when the fastener is in the oriented position, the roller being mounted to frictionally engage the surface of one wall of the guide member such that movement of the ram through the guide goove causes the roller to rotate, the roller projecting from the end of the ram to contact a headed fastener located in the guide groove.

3. The device of claim 2, wherein the roller is mounted on a bracket, the bracket being pivotally mounted to the ram; the device further including spring means fixed to the bracket for urging the bracket toward one wall of the guide member so that the roller frictionally engages the surface of that wall of the guide member.

4. The device of claim 3, further including momentum reduction means fixed to the support frame above the guide member for reducing the momentum of the dropped headed fastener before the headed fastener contacts the guide member.

5. The device of claim 4, wherein the momentum reduction means includes one or more gate elements swingably mounted on the support frame and positioned to lie substantially over the guide groove so that the dropped headed fastener strikes the gate elements prior to entering the guide groove.

6. The device of claim 5, further including a projecting portion attached to one end of the ram and projecting outwardly over the roller.

7. The device of claim 1, further including momentum reduction means fixed to the support frame above the guide member for reducing the momentum of the dropped headed fastener before the headed fastener contacts the guide member.

8. The device of claim 7, wherein the momentum reduction means includes one or more gate elements swingably mounted to the support frame and positioned to lie substantially over the guide groove so that the dropped headed fastener strikes the gate elements prior to entering the guide groove.

9. The device of claim 8, wherein the gyration means includes a roller mounted on the ram for rotation about an axis lying substantially parallel to the longitudinal axis of the headed fastener when the fastener is in the oriented position, the roller being mounted to frictionally engage the surface of one wall of the guide member such that movement of the ram through the guide groove causes the roller to rotate the roller projecting from the end of the ram to contact a headed fastener located in the guide groove.

10. The device of claim 9, wherein the roller is mounted on a bracket, the bracket being pivotally mounted to the ram; the device further including spring means fixed to the bracket for urging the bracket toward one wall of the guide member so that the roller frictionally engages the surface of that wall of the guide member.

11. The device of claim 10, further including a projecting portion attached to one end of the ram and projecting outwardly over the roller.

* * * * *